United States Patent [19]
Struger et al.

[11] 3,974,484
[45] Aug. 10, 1976

[54] PROGRAMMABLE SEQUENCE CONTROLLER

[75] Inventors: Odo J. Struger, Chagrin Falls; William W. Searcy, Richmond Heights, both of Ohio

[73] Assignee: Allen-Bradley Company, Milwaukee, Wis.

[22] Filed: Mar. 31, 1975

[21] Appl. No.: 563,606

[52] U.S. Cl. .............................. 340/172.5
[51] Int. Cl.² ................ G06F 9/06; G05B 19/04
[58] Field of Search ........................ 340/172.5

[56] References Cited
UNITED STATES PATENTS

| | | |
|---|---|---|
| 3,753,243 | 8/1973 | Ricketts et al. .......... 340/172.5 |
| 3,810,118 | 5/1974 | Kiffmeyer ................ 340/172.5 |
| 3,827,030 | 7/1974 | Scipp ..................... 340/172.5 |
| 3,829,842 | 8/1974 | Langdon et al. .......... 340/172.5 |
| 3,849,765 | 11/1974 | Hamano .................. 340/172.5 |

*Primary Examiner*—Raulfe B. Zache
*Attorney, Agent, or Firm*—Quarles & Brady

[57] ABSTRACT

A programmable sequence controller includes a plurality of I/O modules and a corresponding number of memory modules which are sequentially and continuously addressed by a scanning counter. A step counter selects a set of 16 instructions in each memory module which are sequentially read out by the scanning counter. A logic unit advances the step counter when conditions are met to advance to the next programmed step.

11 Claims, 5 Drawing Figures

PROGRAMMABLE SEQUENCE CONTROLLER

BACKGROUND OF THE INVENTION

The field of the invention is electronic controllers for operating industrial equipment.

Sequence controllers have been used to advance industrial equipment through a series of programmed steps. The sequencer is connected to one or more input devices, such as limit switches, photoelectric cells, counters, pushbuttons, selector switches, etc., and in response to the operation of these input devices, the controller energizes and deenergizes operating devices on the controlled system. Such controllers typically include drum switches or diode matrices which store a sequence of programmed steps and the controller advances through the sequence one step at a time. Although some sequence controllers such as that disclosed in British Pat. Specification No. 1,126,891 include means for jumping steps in the sequence, all sequence controllers are characterized by the fact that only the selected input devices necessary to advance the sequencer to the next step are monitored at any one time.

Although they are more elaborate than sequence controllers, process controllers and programmable controllers allow control of asynchronous machines. In programmable controllers such as that disclosed in U.S. Pat. No. 3,810,118 entitled "Programmable Matrix Controller", for example, the status of all of the imput devices on the machines to be controlled are rapidly and repeatedly scanned by the controller and when conditions are proper, as determined by a program stored in the controller memory, one or more operating devices on the machines are energized or deenergized. A substantial amount of high speed logic circuitry is required in programmable controllers to provide this rapid scanning and to quickly make the logical decisions necessary to energize or deenergize the appropriate operating devices on the machines being controlled. Because of their higher cost, process controllers and programmable controllers have typically been applied to perform relatively complex control functions.

SUMMARY OF THE INVENTION

The present invention relates to a programmable sequence controller which melds the attributes of a programmable controller with those of a sequencer. More particularly, the programmable sequence controller of the present invention includes a set of addressable I/O circuit elements which are connectable to input devices and output devices on a machine to be controlled; a memory which stores a control program comprised of a plurality of program steps, each step including a set of program instructions which correspond with the addressable I/O circuit elements; a step counter which sequentially selects each program step; a scanning counter which continuously and sequentially addresses each I/O circuit element and its corresponding selected program instruction; and a logic unit which is responsive to the logic state of selected I/O circuit elements and their corresponding selected program instructions to advance the step counter when programmed conditions have been met.

A general object of the invention is to provide a sequence controller in which the input devices and output devices on the machine being controlled are continuously scanned. The scanning counter continuously cycles while the controller is operating, and during each cycle the status of each input device is coupled to the logic unit. The scanning counter simultaneously reads out instructions from the memory which are applied to the logic unit with the status information. Based on these instructions and the status information, the logic unit determines whether or not the controller should advance to the next programmed step.

Another object of the invention is to minimize the amount of logic circuitry. The status information and the corresponding program instructons are processed substantially serially by the logic unit, thus minimizing the necessary hardware.

A more specific object of the invention is to provide a controller which used highly reliable solid state logic circuitry.

Another general object of the invention is to reduce the size of the memory needed to store the control program. The program instructions stored in the memory of prior programmable controllers include an I/O address code. In the present invention, however, the scanning counter sequentially reads out each selected program instruction and simultaneously addresses its corresponding I/O circuit element. The necessity of storing separate I/O address codes with each program instruction is thus eliminated.

A more specific object of the invention is to provide a one-bit program instruction. A single data bit is sufficient to indicate whether its corresponding input device should be opened or closed before proceeding to the next program step, or whether its corresponding output device should be energized or deenergized.

Another object of the invention is to provide a programmable timer which inhibits the step counter for a present time interval. Each stored program step includes a binary number which is loaded into a timer module by the scanning counter. When the module times out, this is indicated to the logic unit which advances the step counter if the remaining programmed input conditions have been met.

The foregoing and other objects and advantages of the invention will appear from the following description. In the description reference is made to the accompanying drawings which form a part hereof, and in which there is shown by way of illustration a preferred embodiment of the invention. Such embodiment does not necessarily represent the full scope of the invention, however, and reference is made to the claims herein for interpreting the breadth of the invention.

DESCRIPTION OF THE PREFERRED EMBODIMENT

Figure 1:
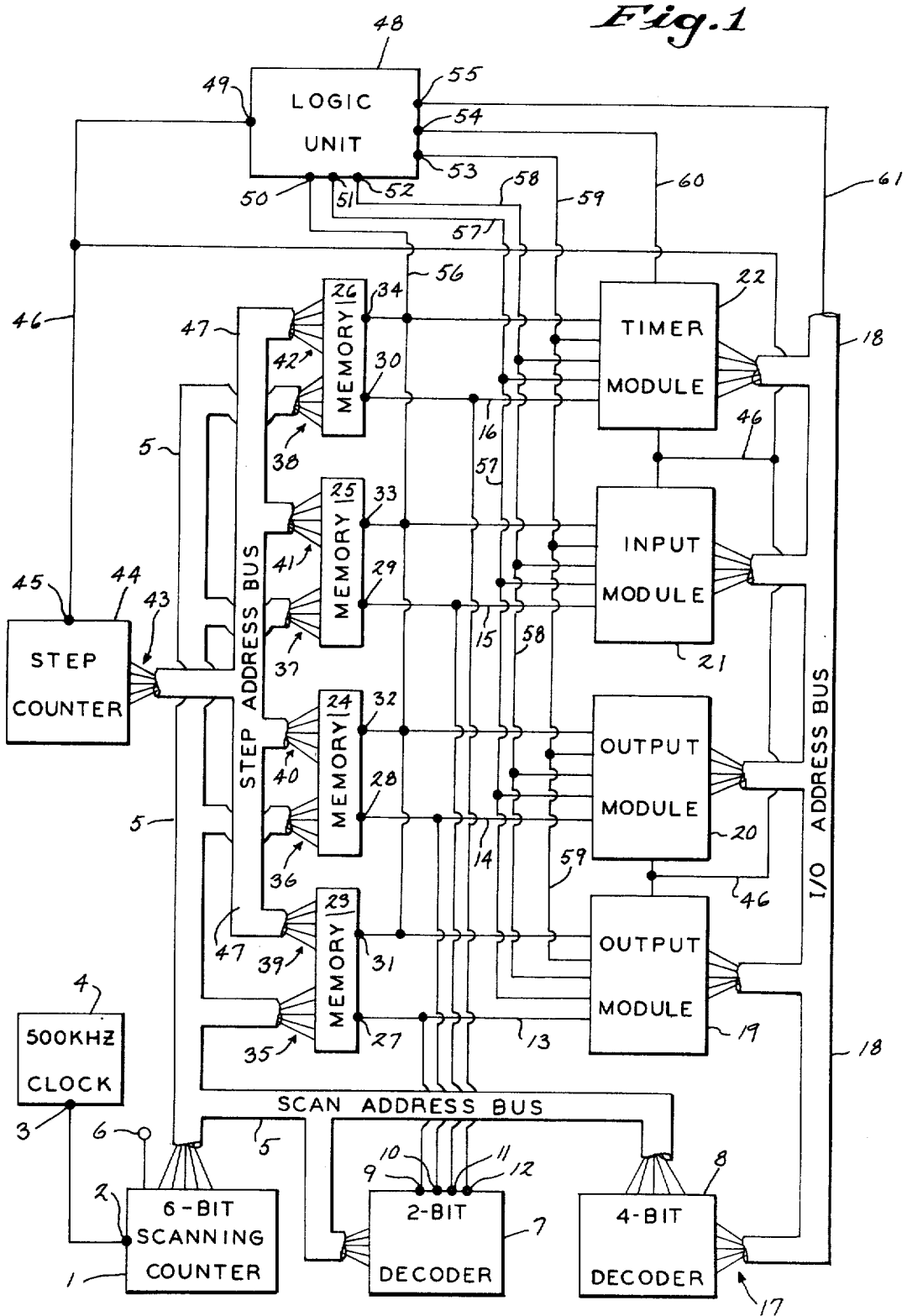
FIG. 1 is a block diagram of the programmable sequence controller of the present invention.

Referring particularly to FIG. 1, the programmable sequence controller includes a six-bit scanning counter 1 that has an input terminal 2 which connects to the output 3 of a 500 kHz clock circuit 4. The scanning counter 1 is formed by cascade connecting two four-bit binary counters, such as integrated circuit SN7493 manufactured by Texas Instruments, Inc. The six least significant digit outputs on the scanning counter 1 connect to leads in a scan address bus 5 and the seventh bit connects to a reset terminal 6. The scanning counter 1 is continuously incremented by the clock 4 and is automatically reset to zero after receiving 64 clock pulses. Each cycle of the scanning counter 1 requires approximately 130 microseconds.

The two most significant digit leads in the scan address bus 5 connect to a two-bit decoder circuit 7 and the four least significant digit leads in the bus 5 connect to a four-bit decoder circuit 8. Four output terminals 9-12 on the two-bit decoder circuit 7 connect to respective module enable lines 13-16, and sixteen output terminals 17 on the four-bit decoder 8 connect to respective leads in an I/O address bus 18. The decoder circuits 7 and 8 are commercially available two-line-to-four-line and four-line-to-16-line decoders such as integrated circuits SN74156 and SN74154 manufactured by Texas Instruments, Inc.

The enable lines 13-16 and the I/O address bus 18 connect to a set of four I/O modules which are identified respectively as first output module 19, second output module 20, input module 21 and timer module 22. As will be explained in more detail hereinafter, each of the I/O modules 19-22 includes 16 separately addressable circuit elements which are each addressed during one cycle, or scan, of the scanning counter 1. Thus, during each scan of the counter 1 the respective enable lines 13, 14, 15 and 16 are driven to a logic high voltage to sequentially enable the I/O modules 19-22, and while each I/O module is thus enabled, logic high voltages are sequentially generated at the 16 leads in the I/O address bus 18 to separately address each of its 16 circuit elements. The 64 I/O circuit elements in the controller I/O modules are thus sequentially addressed once during each 130-microsecond scan of the counter 1.

Associated with each I/O module 19-22 is a memory module 23-26 which stores the control program. Each memory module 23-26 is a 1,024-bit random access memory (RAM) organized as 1,024 one-bit words, and in the preferred embodiment, commercially available Intel 2102 static semi-conductor memory modules are used. Each memory module 23-26 includes a chip enable terminal 27-30 which connects to one of the enable lines 13-16, and each is thus associated with one of the I/O modules 19-22. Each memory module 23-26 also includes a data out terminal 31-34, and each includes a set of ten memory address terminals which are divided into two groups, the step address group and the scan address group. The scan address group on each memory module 23-26 is comprised of the four least significant digit memory address terminals which are indicated collectively as 35, 36, 37 and 38. These connect to the four least significant digit leads in the scan address bus 5. The step address group of address terminals on each memory module 23-26 comprise the remaining six most significant digit memory address terminals which are indicated collectively as 39-42. These terminals 39-42 connect through a step address bus 47 to six corresponding output terminals 43 on a six-bit binary step counter 44. The step counter 44 is a commercially available integrated circuit which includes an input terminal 45 that connects to a step advance bus 46.

When a logic high voltage is generated on the step advance bus 46 the step counter 44 is incremented one count and it thus increments the six-bit binary signal on the step address bus 5 which in turn selects the next set of 16 instructions in each of the memory modules 23-26. In this manner a program step is selected which is comprised of a set of 16 one-bit program instructions in each memory module 23-26 and by incrementing, or advancing, the step counter 44, additional sets of 16 instructions in each of the memory modules 23-26 are sequentially selected. When a program step is thus selected by the step counter 44, the six-bit scanning counter 1 sequentially enables the memory modules 23-26 through the lines 13-16 and sequentially reads out the instructions on the 16 selected lines in each. The scanning counter 1 continuously cycles through the selected sets of program instructions in the memory modules 23-26 to continuously "refresh" the I/O modules 19-22 until conditions are met to advance to the next step in the programmed sequence. The step counter 44 is then incremented one count to address the next step of 16 instructions in each of the memory modules 23-26. In other words, the advancement of the step counter 44 is determined by conditions on the machine being controlled whereas the scanning counter 1 continuously cycles irrespective of these conditions.

Figure 3:
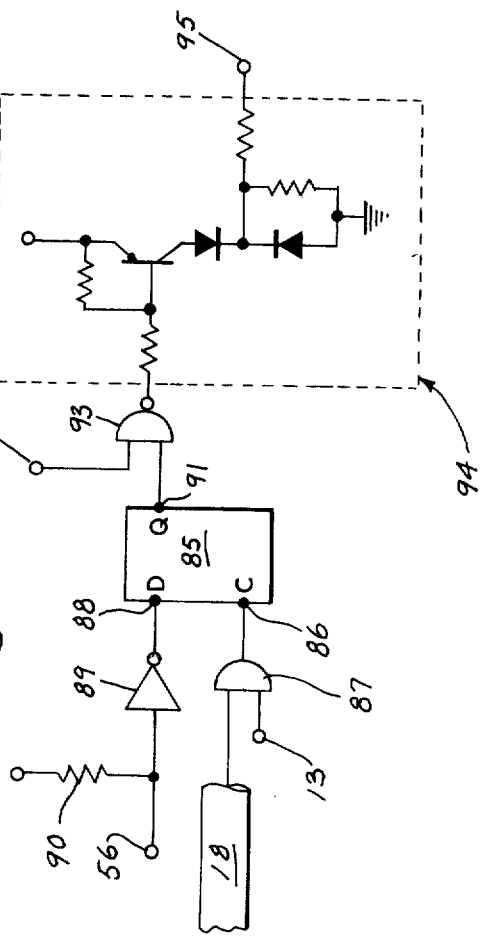
FIG. 3 is an electrical schematic diagram of an output circuit which forms part of the system of FIG. 1.

The conditions, or status, of the machine being controlled is coupled to the programmable sequence controller through the I/O modules 19, 20 and 21. Referring particularly to FIGS. 1 and 3, each of the output modules 19 and 20 includes 16 addressable output circuits which connect with selected output, or operating, devices on the machine being controlled. For example, such output devices might be a solenoid, motor starter, indicator light, or other electrical device which may be energized or deenergized by the controller. Each of the output modules 19 and 20 is associated with a memory module 23 and 24 and each addressable output circuit therein is associated with one of the program instructions selected by the step counter 44. Therefore, as the scanning counter 1 sequentially addresses each of the 32 output circuits in the I/O modules 19 and 20, it simultaneously reads out a sequence of 32 corresponding instruction bits from the memory modules 23 and 24. The logic state of these instruction bits indicates the condition (energized or deenergized) which the corresponding output devices on the controlled system should be in during that selected step of the program.

Referring particularly to FIG. 3, each output circuit in the output module 19 includes a flip-flop 85 which is clocked once during each scan of the counter 1. The flip-flop 85 includes a clock input terminal 86 which connects to the output of an AND gate 87 and a D input terminal 88 which connects to the output of an inverter gate 89. One input on the AND gate 87 connects to a selected lead in the I/O address bus 18 and a second input on the AND gate 87 connects to the enable line 13. An input on the inverter gate 89 connects to a logic high voltage source through a resistor 90 and it also connects to an instruction bus 56 to receive data from the output terminal 31 on the memory module 23.

Once during each scan of the counter 1, a stored instruction bit is read from the memory module 23 into the flip-flop 85 which is simultaneously clocked by the scanning counter 1 through the AND gate 87. The logic state of the instruction bit is inverted from a low true to a high true by the gate 89 and is applied to the D input terminal 88 on the flip-flop 85. The instruction bit is stored in the flip-flop 85 during the remainder of the scanning counter cycle. Because the flip-flop 85 is typically clocked many times during a step, the output circuit is continuously refreshed to provide high output integrity. The logic state of the instruction bit applied to each output circuit remains unchanged until the step counter 44 is advanced to a step in which the corresponding instruction bit indicates the opposite state. A logic low instruction bit out of the memory is an indication that the output device to which the output circuit connects is to be energized, and a logic high instruction bit indicates that it is to be deenergized.

A Q output terminal 91 on each output circuit flip-flop 85 connects through a NAND gate 93 to a suitable output drive circuit indicated generally by the dashed line 94. A second input terminal on the NAND gate 93 connects to a disable bus 96 which is driven by suitable fault detection and fault diagnostic modules (not shown in the drawings). If a malfunction or fault should occur, all of the output drive circuits 94 on the programmable sequence controller are disabled by generating a logic low voltage on the bus 96. The output drive circuit 94 provides the current and voltage gain necessary to drive the output device to which it attaches through an output terminal 95.

Figure 4:
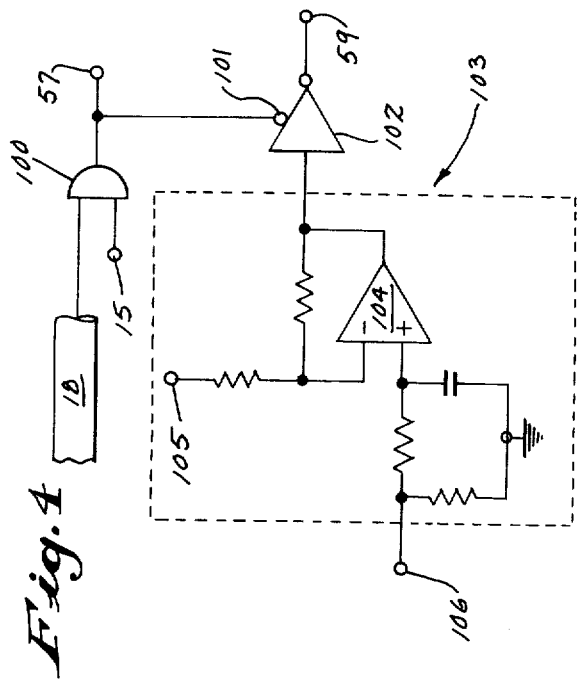
FIG. 4 is an electrical schematic diagram of an input circuit which forms part of the system of FIG. 1.

Referring to FIGS. 1 and 4, the input module 21 includes sixteen separately addressable input circuits which are sequentially addressed during one cycle of the scanning counter 1. One lead in the I/O address bus 18 connects to an input AND gate 100 in each circuit and a second input on the AND gate 100 connects to the module enable line 15. The output of the AND gate 100 connects to an input indicate bus 57 which leads to a logic unit 48, and it also connects to an enable terminal 101 on a tristate inverter gate 102. An input on the inverter gate 102 connects to an input buffer circuit indicated generally by the dashed lines 103 and its output connects to a logic input bus 59 which lead to the logic unit 48. The input buffer circuit 103 includes an operational amplifier 104 which has one input connected to a d-c supply terminal 105 and a second input terminal coupled to a circuit input terminal 106.

An input device on the controlled system, such as a limit switch, connects to the circuit input terminal 106, and when it closes, current flows into the operational amplifier 104 and drives its output to a logic high voltage state. When the input circuit is addressed by the scanning counter 1, a logic high voltage is applied to the enable terminal 101 on the tristate inverter gate 102 and the logic high voltage applied to its input is inverted and coupled to the logic input bus 59. On the other hand, if the input device connected to the circuit input terminal 106 is open, the logic input bus 59 remains at a logic high voltage when the input circuit is addressed. Therefore, as the sixteen input circuits in the input module 21 are addressed by the scanning counter 1, a sequence of 16 logic signals are generated on the logic input bus 59. These signals indicate the condition, or status, of the corresponding input devices on the controlled machine. The determination as to whether the input devices are in condition for advancing to the next step in the program is made in the logic unit 48 which also receives 16 corresponding instruction bits from the memory module 25.

Figure 5:
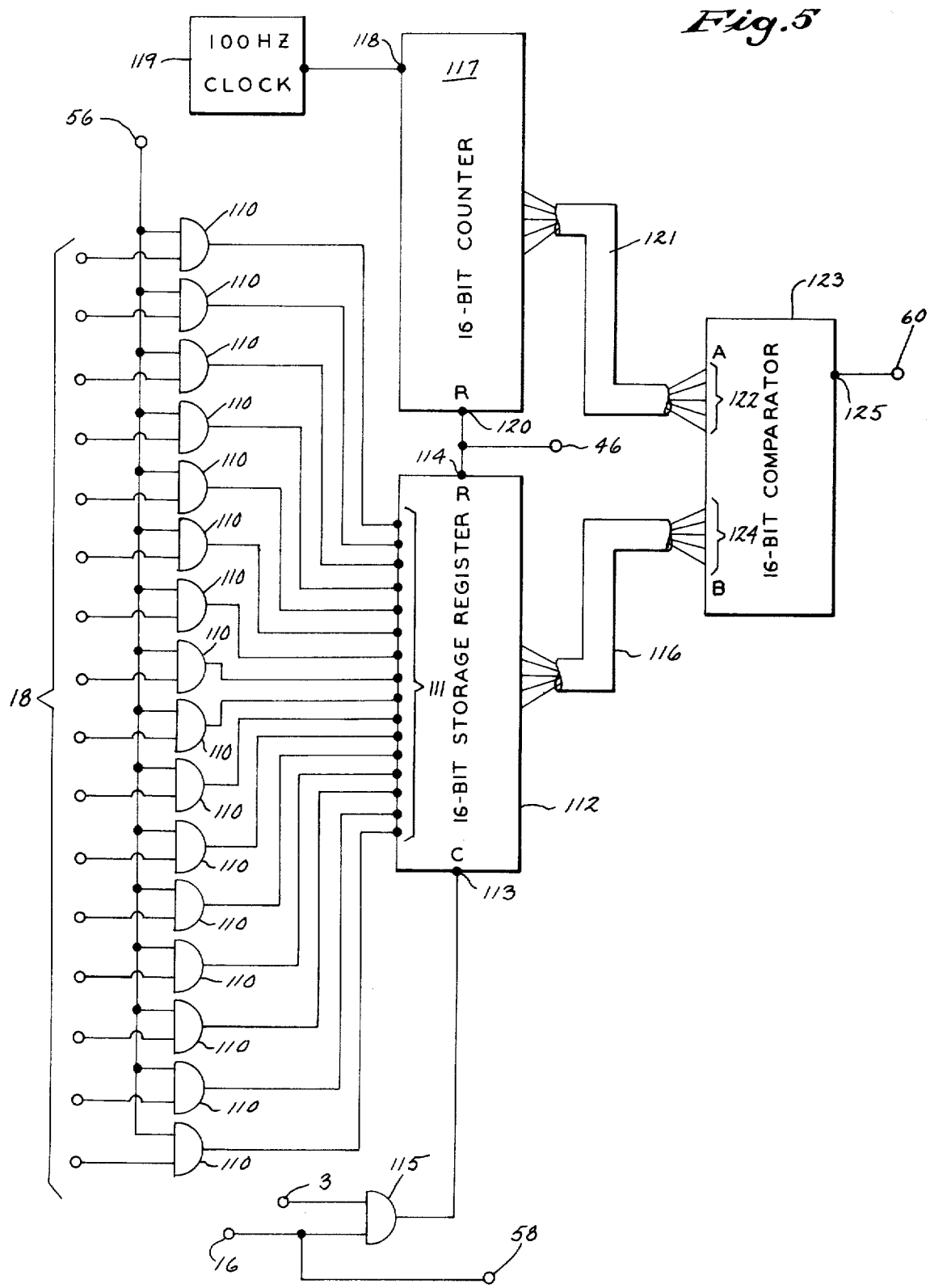
FIG. 5 is an electrical schematic diagram of a timer module which forms a part of the system of FIG. 1.

Referring particularly to FIGS. 1 and 5, the 16 addressable circuit elements in the timer module 22 are comprised of a set of 16 AND gates 110, each of which has one input connected to a selected lead in the I/O address bus 18. A second input on each of the 16 AND gates 110 connects to the instruction bus 56 and an output terminal on each AND gate 110 connects to one of 16 input terminals 111 on a 16-bit storage register 112. The storage register 112 is comprised of 16 commercially available flip-flops such as SN7474 manufactured by Texas Instruments, Inc. The clock terminals on each flip-flop are combined to form a clock terminal 113 on the storage register 112 and the reset terminals are combined to form a reset terminal 114 on the register 112. The reset terminal 114 connects to the step advance bus 46 and the clock terminal 113 connects to the output of an AND gate 115. One input on the AND gate 115 connects to the clock output terminal 3 and a second input thereon connects to the timer module enable line 16 and a timer indicate bus 58.

When the timer module 22 is addressed by the scanning counter 1, the 16 AND gates 110 are sequentially enabled by the I/O address bus 18 and 16 corresponding data bits from the memory module 26 are loaded into the storage register 112 through the respective input terminals 111. The 16-bit word thus loaded into the storage register 112 is a binary number which represents a preset increment of time which must elapse before the controller is advanced to the next step in the program. This 16 bit binary number appears at a set of 16 output terminals on the storage register 112 which connects to corresponding loads in a time preset bus 116.

The timer module 22 also includes a sixteen-bit binary counter 117 which has an input terminal 118 connected to the output of a 100Hz clock 119. A reset terminal 120 on the counter 117 connects to the step advance bus 46 and the counter 117 is thus reset to zero each time the step counter 44 is advanced. The counter 117 is continuously incremented by the 100Hz clock 119 and provides a 16-bit binary number which indicates the elapsed time since the controller was last advanced, or stepped. This 16-bit binary number is generated at a set of output terminals on the counter 117 which connect with respective leads in an accumulated time bus 121.

The leads in the accumulated time bus 121 connect to a set of A terminals 122 on a 16-bit comparator circuit 123. The comparator circuit is formed by coupling four commercially available four-bit comparators such as SN7485 manufactured by Texas Instruments, Inc., and it includes a set of 16 B input terminals 124 which connect to the leads in the time preset bus 116. When the accumulated time indicated by the counter 117 equals or exceeds the programmed time indicated by the storage register 112, a logic low voltage is generated at a comparator output terminal 125. The output terminal 125 connects to a timer data bus 60 which leads to the logic unit 48. Thus, when the step counter 44 is advanced, a programmed time interval stored in the memory module 26 is loaded into the 16-bit storage register 112, and the counter circuit 117 commences to accumulate the elapsed time. When the accumulated time equals or exceeds the programmed time, the timer module 22 "times out" and a logic low voltage is generated to the logic unit 48 on the timer data bus 60.

Figure 2:
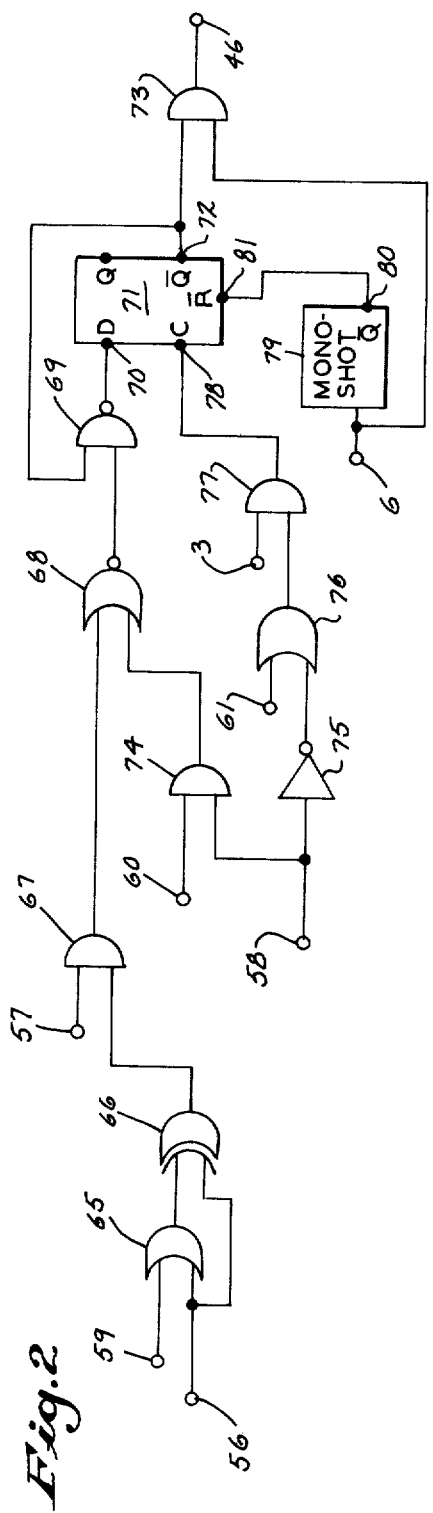
FIG. 2 is an electrical schematic diagram of the logic unit which forms part of the system of FIG. 1.

Referring to FIGS. 1 and 2, the decision to advance the step counter 44 is made by the logic unit 48. The logic unit 48 includes an output terminal 49 which connects to the step advance bus 46, and it includes a set of six input terminals 50–55 that connect with the instruction bus 56, the input indicate bus 57, the timer indicate bus 58, the logic input bus 59, the timer data bus 60 and an I/O address lead 61. The buses lead to each of the I/O modules 19–22, and although only a select few of them are used by any one type of I/O module, this arrangement allows complete interchangeability of the I/O modules to meet the specific requirements of the machine to which the controller is attached. For example, a timer module may not be required on a particular application, but instead, an additional input module may be needed. The I/O address lead 61 is the last of the sixteen leads in the I/O address bus 18 to go high during each cycle of the four-bit decoder 8.

Referring particularly to FIG. 2, the logic unit 48 includes an input OR gate 65 which has one input connected to the logic input bus 59, a second input connected to the instruction bus 56 and an output connected to one input on an exclusive OR gate 66. A second input terminal on the exclusive OR gate 66 connects to the instruction bus 56 and its output terminal connects to one input on and AND gate 67. A second input on the AND gate 67 connects to the input indicate bus 57 and its output connects to one input on a NOR gate 68. The output of the NOR gate 68 connects to one input on a NAND gate 69 and the output on the NAND gate 69 connects to a D input 70 on a flip-flop 71. A $\bar{Q}$ output 72 on the flip-flop 71 connects to a second input on the NAND gate 69 and it connects to one input on an output AND gate 73. A second input on the output AND gate 73 connects to the reset terminal 6 on the scanning counter 1. The AND gate output serves as the output terminal 49 of the logic unit 48 which drives the step advance bus 46.

An input AND gate 74 has one input connected to the timer data bus 60, a second input connected to the timer indicate bus 58, and an output connected to a second input on the NOR gate 68. The timer indicate bus 58 also connects through an inverter gate 75 to one input on an OR gate 76 and a second input on the OR gate 76 connects to the I/O address lead 61. An output on the OR gate 76 connects to one input on an AND gate 77 and a second input on the AND gate 77 connects to the clock output terminal 3. An output terminal on the AND gate 77 connects to the C input 78 on the flip-flop 71. A monoshot circuit 79 has an input which connects to the reset terminal 6 on the scanning counter 1 and it has a $\bar{Q}$ output 80 which connects to a reset terminal 81 on the flip-flop 71.

Referring particularly to FIGS. 1 and 2, when the sixteen addressable elements in the input module 21 are being addressed by the scanning counter 1, the input module 21 generates a logic high voltage on the input indicate bus 57 and a succession of 16 logic signals on the logic input bus 59. As discussed above, these logic signals indicate the status of each addressable element in the input module 21 and they are applied to one input on the OR gate 65. At the same time a succession of 16 instruction bits are read out of the memory module 25 and are applied to the other input on the OR gate 65 through the instruction bus 56. The function of the logic unit 48 is to compare the actual condition of the input devices as indicated by the input circuits with the programmed conditions indicated by the sixteen stored instruction bits. A logic high, or "one", on the instruction bus 56 indicates a "don't care" condition, i.e. the addressed input element may be either opened or closed, whereas, if a logic low, or "zero", is generated on the instruction bus 56, the addressed input element must be closed. For example, if a logic high "don't care" instruction bit is read out of the controller memory on the instruction bus 56, a logic high voltage is applied to both input terminals of the exclusive OR gate 66 and its output terminal is driven to a logic low voltage state. On the other hand, if a logic low instruction bit is read out of the controller memory on the instruction bus 56, the logic input bus 59 must also be at a logic low voltage if a logic low is to be generated at the output terminal of the exclusive OR gate 66. In other words, when a logic low is generated on the instruction bus 56, the corresponding addressed input device must be closed to generate a logic low at the output of the exclusive OR gate 66.

As each of the sixteen addressable elements in the input module 21 are tested, a logic high voltage is generated on the input indicate bus 57 and the results of each test are gated through the AND gate 67 and NOR gate 68 to the NAND gate 69. The flip-flop 71 is reset at the beginning of each scan and a logic high voltage is thus generated at its $\bar{Q}$ output terminal 72 which is applied to the other input of the NAND gate 69. As long as the addressed elements in the input module 21 test true (indicating that conditions are proper to advance to the next step) a logic high voltage is applied to the input of the NAND gate 69 and the D input terminal 70 on the flip-flop 71 is held at a logic low voltage. Each input element is separately tested in synchronism with clock pulses which are applied to the C input terminal 78 on the flip-flop 71 through the AND gate 77. If conditions are proper to advance to the next step the flip-flop 71 remains reset throughout the entire scan. However, if one of the addressable input elements tests false, a logic high voltage is applied to the D input terminal 70 and the flip-flop 71 is set to generate a logic low voltage at its $\bar{Q}$ output terminal 72. The flip-flop 71 remains in this set state regardless of the outcome of subsequent tests during the same scan and it thus indicates that the controlled system is not in the proper condition to advance to the next programmed step. When the scanning counter 1 has addressed all of the I/O modules 19-22, a logic high voltage is generated at the reset terminal 6, and is applied to the output AND gate 73 in the logic unit 48. If all of the addressed I/O elements during that scan have tested true, the $\bar{Q}$ output terminal 72 on the flip-flop 71 is at a logic high voltage and this is gated through the AND gate 73 to the step advance bus 46. If any one or more of the I/O elements addressed during that scan have tested false, a logic low voltage is gated to the step advance bus 46 and the controller repeats the same programmed tests.

Whereas each of the 16 addressable elements in the input module 21 are separately tested by the logic unit 48, such is not the case when the scanning counter 1 is addressing the timer module 22. As indicated above, the timer module 22 includes a 16-bit register 112 which is loaded with a binary number that represents a time interval. The timer module 22 also includes a counter which accumulates the elapsed time and when the elapsed time corresponds to the programmed time, a logic high voltage is generated by the timer module on the timer data bus 60. Referring again to FIG. 2, the timer bus data is gated through the AND gate 74 and NOR gate 68 to the NAND gate 69. However, the logic high voltage generated on the timer indicate bus 58 by the timer module 22 inhibits the application of clock pulses to the C input terminal 78 on the flip-flop 71 until the last, or sixteenth, addressable element in the timer module 22 is scanned. When this occurs, the I/O address lead 61 is driven to a logic high voltage which enables the AND gate 77 and clocks the flip-flop 71. If the timer module 22 has "timed out" the flip-flop 71 remains in its reset state. If it has not timed out, the flip-flop 71 is set to indicate that the controller should not advance to the next step in the program.

It should be apparent to those skilled in the art that numerous variations can be made in the above described structure without departing from the spirit of the invention. For example, the addressable circuit elements in the I/O modules are sequentially scanned one at a time in the preferred embodiment. However, if a reduction in the scanning rate is desired this can easily be accomplished by sequentially addressing groups of circuit elements and providing a corresponding amount of parallel data processing hardware. Also, each program instruction which corresponds to an input circuit in the preferred embodiment is comprised of a single bit which indicates either that the associated sensing device should be "closed" or it indicates that the controller "doesn't care". By removing the OR gate 65 in the logic unit 48 this can be altered to indicate "closed " or "opened". Also, by adding bits to each program instruction other known controller functions can be performed such as branching, jumping, etc.

We claim:

1. A programmable sequence controller, the combination comprising:

a set of addressable I/O circuit elements, each circuit element being coupled to a device on a machine to be controlled;

a memory for storing a control program comprised of a plurality of program steps, each program step including a set of program instructions which correspond with said addressable I/O circuit elements;

means connecting said memory to at least one of said addressable I/O circuit elements for coupling data thereto;

a step counter which is connected to said memory for selecting a program step and which is responsive to a logic signal at an input to select one of said plurality of program steps;

a scanning counter connected to said addressable I/O circuit elements and to said memory, siad scanning counter being operable to continuously and sequentially address each of said I/O circuit elements and their corresponding selected program instructions; and a logic unit connected to said memory and said addressable I/O circuit elements, said logic unit being responsive to the logic state of selected I/O circuit elements and their corresponding selected program instructions to generate a logic signal which advances said step counter to another program step.

2. The programmable sequence controller as recited in claim 1, wherein each program instruction is comprised of a single data bit, said addressable I/O circuit elements include output circuits which connect to said coupling means and which connect to associated output devices on the machine being controlled and input circuits which connect to associated input devices on the machine being controlled, and in which the states of said output devices on the controlled machine are determined for each selected program step by the logic state of the selected instruction bits in said memory which correspond to their associated output circuits.

3. The programmable sequence controller as recited in claim 2 in which the logic unit includes means for comparing each instruction bit in a selected program step which corresponds to an input circuit with the logic state of the input device which is associated with that input circuit.

4. The programmable sequence controller as recited in claim 3 in which said logic unit includes means for storing the results of said comparisons made during each cycle of the scanning counter, and it includes gate means which is responsive at the end of each scanning counter cycle to couple said stored result to the input of said step counter.

5. The programmable sequence controller as recited in claim 3 in which said means for comparing the logic state of said input devices with their corresponding selected instruction bits includes gate means for disabling said comparison means when said instruction bit is in a selected one of its two logic states.

6. The programmable sequence controller as recited in claim 1 in which said addressable I/O circuit elements include input circuits which connect to associated input devices on the machine being controlled and which indicate to the logic unit the state of their associated input devices when addressed by said scanning counter.

7. The programmable sequence controller as recited in claim 6 in which said logic unit includes means for comparing an instruction bit in each selected program instruction which corresponds to an input circuit with the state of the input device which is associated with that input circuit.

8. The programmable sequence controller as recited in claim 7 in which said logic unit includes means for storing the results of said comparisons made during each cycle of the scanning counter, and it includes gate means which is responsive at the end of each scanning counter cycle to couple said stored result to the input of said step counter.

9. The programmable sequence controller as recited in claim 8 in which a plurality of said addressable I/O circuit elements are logic gates connected to a storage register in a timer module, and said timer module includes counter means for accumulating elapsed time and means for comparing the accumulated time with the contents of said storage register and generating a logic signal to said logic unit when said timer module has timed out.

10. The programmable sequence controller as recited in claim 9 in which said logic unit storage means is responsive to store the logic signal from said timer module during each cycle of the scanning counter.

11. A programmable sequence controller, the combination comprising:

a set of addressable input circuits, each having an input terminal connectable to an input device on a machine to be controlled and each having an output terminal;

a set of addressable output circuits, each having an input terminal and each having an output terminal connectable to an output device on said controlled machine;

a memory for storing a control program comprised of a sequence of program steps, each program step including a first set of program instructions which correspond with said addressable input circuits and a second set of program instructions which correspond with said addressable output circuits;

a step counter connected to said memory for sequentially selecting said stored program steps;

a scanning counter connected to said input and output circuits and said memory, said scanning counter being operable to continuously and sequentially address each of said input circuits and output circuits and to simultaneously address their corresponding selected program instructions stored in said memory;

a logic input bus connected to the output terminal on each of said input circuits;

an instruction bus connected to said memory to receive and convey said addressed program instructions and connected to the input terminal of each of said output circuits; and a logic unit connected to said logic input bus and said instruction bus, said logic unit including means for comparing the logic state of said instruction bus with the logic state of said logic input bus and means responsive to said comparisons for advancing said step counter to the next program step.

* * * * *